United States Patent Office 3,526,691
Patented Sept. 1, 1970

3,526,691
METHOD FOR MAKING ASBESTOS-CEMENT SHAPES
Frederick E. Hawkins, Montgomery, Pa., and Joseph L. Cangelosi, Caparra Heights, Puerto Rico, assignors to Certain-Feed Products Corporation, Ardmore, Pa., a corporation of Maryland
Continuation-in-part of application Ser. No. 511,732, Dec. 6, 1965. This application Sept. 9, 1968, Ser. No. 758,426
Int. Cl. B28b 3/26
U.S. Cl. 264—148        5 Claims

ABSTRACT OF THE DISCLOSURE

A method for use in the extrusion of asbestos-cement shapes by means of a screw extruder. Batches of a prepared mix are sequentially delivered to the extruder to maintain a substantially continuous operation. Lengths of the extruded shape are cut off and the cut lengths are straightened prior to precuring and final curing.

---

The present application is a continuation-in-part of our prior application 511,732 filed Dec. 6, 1965. and now abandoned.

This invention relates to the production of articles or shapes composed of asbestos-cement compositions, and is especially concerned with a method for use in making elongated shapes, such as structural pieces, boards, pipes, etc.

It has long been proposed to fabricate or form various articles from aqueous asbestos-cement mixtures by means of extrusion, but this type of operation has been subject to disadvantages and difficulties, especially when employing screw extruders. One of the problems encountered heretofore is that the power requirements for effecting screw extrusion are excessively high if the aqueous asbestos-cement mixture fed to the extruder contains only the stoichiometric quantity of water, or a quantity such that the extrusion will retain its shape prior to curing. The extrusion of a shape retaining mixture is of great advantage, since otherwise it is virtually impossible to form articles of various complex shapes, or even articles having interior hollows which would be distorted or destroyed by sagging of material which is not sufficiently stiff to retain its shape.

Thus, although power requirements for extrusion may not be excessive if excess quantities of water are employed, it is not practical to handle the relatively soft extrusion resulting from a mixture containing excessive quantities of water.

Some attempts have also been made to form articles by extruding an asbestos-cement mixture containing an excess quantity of water, and thereafter rolling or squeezing the extrusion to eliminate excess water. This procedure has the disadvantage that the cross sectional shape of the piece being made is not established by the orifice in the extruder nozzle and is therefore much more subject to variation and inaccuracy than in the case where the cross sectional shape of the extrusion is established by the size or dimensions of the extrusion orifice.

With the foregoing in mind, the invention has as its principal general objective the provision of a method for facilitating the production of asbestos-cement shapes by screw extrusion.

Among the various features of the invention which serve the above purpose are the following:

First, we have found that the manner of admixture of the ingredients prior to delivery thereof to the screw extruder is an important factor in facilitating screw extrusion. More particularly, we have found that screw extrusion requires much less power if the mixing operation is carried on in a manner to initially thoroughly admix the dry ingredients of the furnsh and then add and mix in the water, but terminate the mixing action after only a very brief interval of mixing following the addition of water. In general, the mixing action is terminated substantially as soon as the dry ingredients are all wetted, and this may be accomplished in the manner referred to hereinafter and also in our parent application 511,732 above identified.

The invention is especially concerned with certain improved techniques for the handling of the extruded pieces prior and during curing thereof, thereby facilitating making of accurately sized extruded shapes. In connection with the handling apparatus, the invention also has in view the provision of apparatus for handling the extruded pieces arranged to provide for the separation or cutting off of definite lengths of the shape being extruded, and further arranged to handle such separated lengths, straighten them, and deliver them to a region of curing, while at the same time minimizing the time during which the extrusion operation need be interrupted. In this way the extrusion itself is facilitated, since excessively long periods of interruption have a tendency to increase the difficulty encountered in effecting the extrusion operation. By virtue of reduction in periods of interruption of the extrusion operation, the invention makes possible realization to the full of the advantages incident to ease of extrusion which results from the above referred to mixing technique which is preferably applied to the ingredients making up the furnish prior to feed of the furnish to the extrusion apparatus itself.

The arrangement of the equipment for these purposes will be fully set out hereinafter.

How the foregoing and other objects and advantages are attained will appear more fully from the following description referring to the accompanying drawings which illustrate the preferred embodiment of the equipment, various novel features of applicants' method also being described hereinafter as carried out by means of the equipment shown in the accompanying drawings.

FIGS. 1a and 1b, taken together illustrate in side elevational outline the overall arrangement of the furnish mixing equipment, the extrusion equipment, and the equipment for handling the extruded pieces, all constructed and relatively arranged in accordance with the present invention;

FIG. 2 is an enlarged sectional view taken as indicated by the line 2—2 on FIG. 1, and illustrating a portion of the equipment for supporting the extruded shapes as they are delivered from the extruder; and FIGS. 3 to 9 inclusive are somewhat diagrammatic views illustrating a modification of the equipment for handling and straightening successive separated lengths of the shape being extruded.

In connection with the illustration of equipment in the drawings it is to be kept in mind that some variations and modifications may be adopted, particularly in the general relative disposition of the major components. Thus, while the drawings illustrate a mixing apparatus located closely above the extruding apparatus, it should be understood that other general arrangements could be used for instance the mixing apparatus could be located on the same level with the extruding apparatus, and appropriate transfer mechanism provided.

In describing the equipment illustrated in the drawings, reference is first made to FIGS. 1a and 1b. In the lower portion of FIG. 1a there is illustrated a form of extrusion equipment suitable for employment in accordance with the present invention, this arrangement being of known type and including several components, such as the pug mill indicated generally at 8, the extruder indicated generally at 9, and an interconnecting vacuum

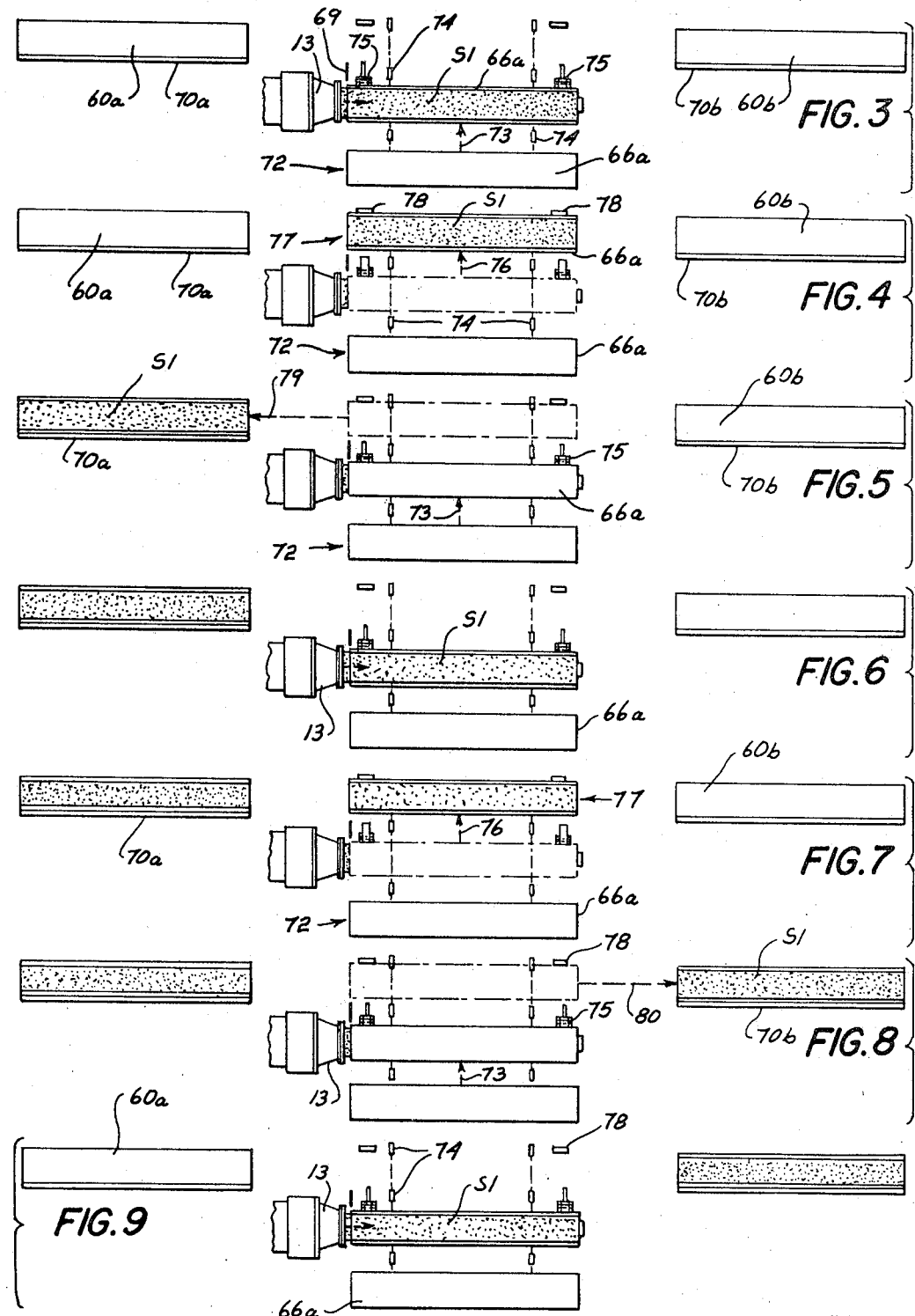

United States Patent Office 3,526,691
Patented Sept. 1, 1970

3,526,691
METHOD FOR MAKING ASBESTOS-CEMENT SHAPES
Frederick E. Hawkins, Montgomery, Pa., and Joseph L. Cangelosi, Caparra Heights, Puerto Rico, assignors to Certain-Feed Products Corporation, Ardmore, Pa., a corporation of Maryland
Continuation-in-part of application Ser. No. 511,732, Dec. 6, 1965. This application Sept. 9, 1968, Ser. No. 758,426
Int. Cl. B28b 3/26
U.S. Cl. 264—148   5 Claims

ABSTRACT OF THE DISCLOSURE

A method for use in the extrusion of asbestos-cement shapes by means of a screw extruder. Batches of a prepared mix are sequentially delivered to the extruder to maintain a substantially continuous operation. Lengths of the extruded shape are cut off and the cut lengths are straightened prior to precuring and final curing.

---

The present application is a continuation-in-part of our prior application 511,732 filed Dec. 6, 1965, and now abandoned.

This invention relates to the production of articles or shapes composed of asbestos-cement compositions, and is especially concerned with a method for use in making elongated shapes, such as structural pieces, boards, pipes, etc.

It has long been proposed to fabricate or form various articles from aqueous asbestos-cement mixtures by means of extrusion, but this type of operation has been subject to disadvantages and difficulties, especially when employing screw extruders. One of the problems encountered heretofore is that the power requirements for effecting screw extrusion are excessively high if the aqueous asbestos-cement mixture fed to the extruder contains only the stoichiometric quantity of water, or a quantity such that the extrusion will retain its shape prior to curing. The extrusion of a shape retaining mixture is of great advantage, since otherwise it is virtually impossible to form articles of various complex shapes, or even articles having interior hollows which would be distorted or destroyed by sagging of material which is not sufficiently stiff to retain its shape.

Thus, although power requirements for extrusion may not be excessive if excess quantities of water are employed, it is not practical to handle the relatively soft extrusion resulting from a mixture containing excessive quantities of water.

Some attempts have also been made to form articles by extruding an asbestos-cement mixture containing an excess quantity of water, and thereafter rolling or squeezing the extrusion to eliminate excess water. This procedure has the disadvantage that the cross sectional shape of the piece being made is not established by the orifice in the extruder nozzle and is therefore much more subject to variation and inaccuracy than in the case where the cross sectional shape of the extrusion is established by the size or dimensions of the extrusion orifice.

With the foregoing in mind, the invention has as its principal general objective the provision of a method for facilitating the production of asbestos-cement shapes by screw extrusion.

Among the various features of the invention which serve the above purpose are the following:

First, we have found that the manner of admixture of the ingredients prior to delivery thereof to the screw extruder is an important factor in facilitating screw extrusion. More particularly, we have found that screw extrusion requires much less power if the mixing operation is carried on in a manner to initially thoroughly admix the dry ingredients of the furnsh and then add and mix in the water, but terminate the mixing action after only a very brief interval of mixing following the addition of water. In general, the mixing action is terminated substantially as soon as the dry ingredients are all wetted, and this may be accomplished in the manner referred to hereinafter and also in our parent application 511,732 above identified.

The invention is especially concerned with certain improved techniques for the handling of the extruded pieces prior and during curing thereof, thereby facilitating making of accurately sized extruded shapes. In connection with the handling apparatus, the invention also has in view the provision of apparatus for handling the extruded pieces arranged to provide for the separation or cutting off of definite lengths of the shape being extruded, and further arranged to handle such separated lengths, straighten them, and deliver them to a region of curing, while at the same time minimizing the time during which the extrusion operation need be interrupted. In this way the extrusion itself is facilitated, since excessively long periods of interruption have a tendency to increase the difficulty encountered in effecting the extrusion operation. By virtue of reduction in periods of interruption of the extrusion operation, the invention makes possible realization to the full of the advantages incident to ease of extrusion which results from the above referred to mixing technique which is preferably applied to the ingredients making up the furnish prior to feed of the furnish to the extrusion apparatus itself.

The arrangement of the equipment for these purposes will be fully set out hereinafter.

How the foregoing and other objects and advantages are attained will appear more fully from the following description referring to the accompanying drawings which illustrate the preferred embodiment of the equipment, various novel features of applicants' method also being described hereinafter as carried out by means of the equipment shown in the accompanying drawings.

FIGS. 1a and 1b, taken together illustrate in side elevational outline the overall arrangement of the furnish mixing equipment, the extrusion equipment, and the equipment for handling the extruded pieces, all constructed and relatively arranged in accordance with the present invention;

FIG. 2 is an enlarged sectional view taken as indicated by the line 2—2 on FIG. 1, and illustrating a portion of the equipment for supporting the extruded shapes as they are delivered from the extruder; and FIGS. 3 to 9 inclusive are somewhat diagrammatic views illustrating a modification of the equipment for handling and straightening successive separated lengths of the shape being extruded.

In connection with the illustration of equipment in the drawings it is to be kept in mind that some variations and modifications may be adopted, particularly in the general relative disposition of the major components. Thus, while the drawings illustrate a mixing apparatus located closely above the extruding apparatus, it should be understood that other general arrangements could be used for instance the mixing apparatus could be located on the same level with the extruding apparatus, and appropriate transfer mechanism provided.

In describing the equipment illustrated in the drawings, reference is first made to FIGS. 1a and 1b. In the lower portion of FIG. 1a there is illustrated a form of extrusion equipment suitable for employment in accordance with the present invention, this arrangement being of known type and including several components, such as the pug mill indicated generally at 8, the extruder indicated generally at 9, and an interconnecting vacuum chamber indicated at 10. The screw within the pug mill and the screw within the extruder are both adapted to be driven through the drive mechanism indicated generally at 11.

The details of the components 8, 9, 10 and 11 need not be considered herein as they form no part of the invention per se but it is mentioned that, as shown, the extruder 9 comprises a cylindrical shell in which a screw 12 is adapted to work, the screw blades being of decreasing pitch toward the delivery end (toward the right in FIG. 1a) in order to increase the compression in the region just in advance of the extrusion orifice, which is provided at the right-hand end of the nozzle indicated at 13. In the example illustrated, it is assumed that the extrusion nozzle has a rectangular orifice therein suitable for extrusion of an elongated piece or board of rectangular shape, as indicated at S in FIG. 2.

The input end of the extruder 9 receives the material to be extruded through a chamber 10 in which a vacuum is drawn, for instance by means of the vacuum connection 14, the material to be extruded being delivered into the upper portion of the vacuum chamber from the delivery end of the screw 15 disposed within the pug mill 8. The flights or turns of the screw elements of the pug 15 are also of decreasing pitch toward the discharge end, in order to increase the compression just in advance of the delivery of the material into the vacuum chamber 10. Suitable choppers indicated diagrammatically at 16 are arranged at the delivery end of the pug mill in order to subdivide the material as it enters the vacuum chamber, thereby facilitating release of air and gases entrapped in the asbestos-cement mixture by the action of the vacuum in the chamber 10, in a manner known per se in equipment of this sort.

The entrance end of the pug mill (toward the left of FIG. 1a) is supplied with material from the reservoir or supply chamber 17 which extends upwardly from the pug mill to the floor or bottom of the muller crib which is indicated generally in FIG. 1a by the numeral 18.

The details of construction of the mulling equipment need not be considered herein, but it is mentioned that mulling wheels are arranged to be capable of rapid lifting when it is desired to terminate the mixing operation and that a dump gate is provided in the bottom of the muller crib 18 in order to deliver the prepared batches of furnish into the supply chamber 17 of the extruder. The mechanism provided for this purpose is more fully disclosed in our copending application above identified.

As above mentioned, in the embodiment illustrated the discharge or nozzle device 13 of the extruder is provided with a rectangular discharge orifice in order to extrude a piece of rectangular section, such as the board S. In the embodiment of FIGS. 1a, 1b and 2 the piece being extruded is received and supported on an elongated table 60 pivotally mounted at the upper ends of supporting structure 61 by means of pivots 62 having axes paralleling the direction of extrusion in order to provide for tilting of the table between the full-line position shown in FIG. 2 and the position shown in dot-and-dash lines in FIG. 2. The table may either be tilted by hand or by power mechanism such as indicated, including arms 63 which are connected by means of piston rods 64 with operating cylinders 65, the rods 64 being associated with pistons (not shown) within the cylinders 65, by means of which the table may be rocked between the two positions indicated in FIG. 2.

When using the equipment of FIGS. 1a, 1b and 2, a board 66 is placed upon the table 60 and the piece being extruded is received upon this board 66, the board being removable and serving as a carrier element by means of which an extruded piece may be removed from the table and taken to an appropriate point for curing while additional pieces are being extruded.

For the purpose of facilitating sliding of the piece being extruded upon the board 66, a supply roll 67 of a film or web of material having a low coefficient of friction, such as waxed paper, is mounted below the end of the table 60 close to the extrusion orifice, the strip 68 being extended upwardly from the supply roll and thence over and along the board 66, in the position best seen in FIG. 2. In accordance with the preferred technique of the invention, the leading end of the waxed paper strip is started over the leading end of the board 66 at the commencement of an extrusion, and the waxed paper travels with the extrusion, thereby reducing the friction between the extruded piece and the board 66 during the extrusion operation itself. When an appropriate length has been extruded, the extruder is temporarily stopped and the paper strip and extruded piece then severed. The extrusion itself may be cut off as by means of a cutting disc indicated at 69 mounted to travel transverse the direction of extrusion. The paper may be severed in any convenient manner.

The movement or sliding of the extrusion along the board 66 or other similar support may also be facilitated by the provision of parallel grooves in the board surface running in the direction of the extrusion. Indeed with such a grooved board the use of a wax paper or similar web such as indicated at 68 may be dispensed with, particularly where the groove board is provided with a lubricant on its face or is coated with polytetrafluoroethylene or other material having a low coefficient of friction.

After the extrusion of a piece of predetermined length and after severing thereof in the region of the extrusion orifice, the table 60 is preferably tilted, for instance in the position indicated in dot-and-dash lines in FIG. 2 in order to facilitate bringing the edge of the extruded piece S against the edge guide or "straight edge" 70 (see FIG. 2). This arrangement provides for straightening the piece just extruded prior to removal thereof from the table 60 and delivery or carrying of the piece to the curing station.

In accordance with another feature of the preferred technique of the invention, the table 60 and also the board 66 is of length equal to more than one times the desired length of the pieces being produced. For example, the table 60 is advantageously made of length equal to at least twice that of the length of the boards to be produced in accordance with the embodiment illustrated. Indeed the table is preferably made even somewhat longer than twice the length of the pieces being made for a purpose which will be explained. Each operation of the extruder is, in this illustrative embodiment, continued for an interval sufficient to extrude a piece at least twice the length of that ultimately desired. Upon the completion of such an extrusion operation, the cut-off disc 69 is operated as already mentioned above, and after straightening of the piece by tilting the table, the table is returned to the horizontal and the straightened piece is cut to form a plurality of pieces, for instance by a second cut-off disc shown at 71 in FIG. 1b. In the embodiment as illustrated the disc 71 is located in position to cut the extrusion at about the midpoint, thereby producing two articles or boards of the desired predetermined length, both of which have previously been straightened in one operation, in the manner already described with reference to FIG. 2. With many types of pieces there is a tendency for the initial portion of the extrusion to assume an excessive amount of curvature, and for this reason with many pieces it is contemplated to employ a table which is somewhat greater in length than twice the length of a piece to be made. For instance in the making of two 8 ft. pieces, the table may desirably be of length sufficient to accommodate a 19 foot extrusion, and the cutoff saws arranged so as to cut off the leading 3 feet of the extrusion, and then to cut the remaining 16 feet at the center, in addition to effecting a cut near the extruder nozzle. The leading 3-foot piece may be returned to the pub mill for reuse.

Alternatively, an extra length table or support may be employed, and cuts may be made to separate the desired length of article by cutting only at a substantial distance, say a matter of 10 feet, from the extruder nozzle, and in this case, the "connection," so to speak, of the remaining portion of the extrusion with the extruder aids in preventing undesired or excessive curvature during the next succeeding extrusion operation.

The embodiment of the extrusion handling equipment illustrated in FIGS. 3 to 9 inclusive and also certain other variations will be described hereinafter following description of a typical overall operation in the first described embodiment of the equipment.

As mentioned hereinabove, one of the problems encountered in attempts to extrude asbestos-cement compositions, especially by screw extrusion, is the excessive power required to effect the extrusion. According to the present invention the power required is reduced as a result of mixing the ingedients of the extrusion composition in a special manner as will be described just below in connection with a typical mixing operation.

The dry ingredients are first introduced into the crib 18 and in a typical batch a total of about 440 pounds of the dry ingredients will be introduced. Although for most purposes the presence of at least some silica is preferred, this is not necessary and in an illustrative composition usable with the present invention the dry ingredients may include only cement and asbestos, for instance 30 pounds of asbestos for each 100 pounds of cement. The mulling wheels are operated to effect mixture of the cement and asbestos in the dry condition, and this may be accomplished by running the wheels for a period of about one minute to about five minutes.

After this dry mixing, 24 parts by weight of water for each 100 parts of the mixed dry materials are added while continuing the mulling. The rate of addition of the water may be varied somewhat depending upon several factors, including the length of time of mulling or mixing following the addition of the water. In general the water should be added within a relatively short period of time. In the present illustrative example a water addition time of about 10 seconds is usable and the mulling is continued after the addition of the water but only for a very limited and carefully controlled time. With a batch containing a total of about 440 parts of dry solids, a typical mixing time following the addition of the water is of the order of 20 seconds. Some variations in the time for water addition and for mixture after the water addition are permissible but it is contemplated that the mixing shall be terminated as soon as the dry ingredients are all wetted.

After a batch of material has been prepared in the crib in the manner described above, the batch is dumped into the reservoir 17 above the pug mill 8 by opening the dump gate above mentioned. This batch now delivered into the chamber 17, serves as a source of supply for the pug mill 8 and the extruder itself (9) during the mixing of a subsequent batch. With the embodiment of the apparatus as shown in FIGS. 1 and 2, the extruder and pug mill may be operated intermittently providing an interval of dwell during each operation during which the cut-off disc 69 is operated, the table 60 is tilted and the cut-off disc 71 is operated.

Turning now to the embodiment shown in FIGS. 3 to 9 inclusive, it is first pointed out that the equipment here shown is an alternative arrangement of equipment for handling extruded pieces. However certain of the elements or devices used are the same as or similar to those employed in the embodiment of FIGS. 1a, 1b and 2. Therefore either the same or similar reference characters are employed for certain elements.

The extrusion nozzle of the extruder is indicated in FIGS. 3 to 9 by the numeral 13, and it is here assumed that, as in the first embodiment, the extrusion orifice is of rectangular shape so as to extrude a board-shaped piece. This piece is indicated in FIGS. 3 to 9 by the reference character S1.

Referring now in more detail to the arrangement of parts of the embodiments of FIGS. 3 to 9, it is first noted that these figures represent diagrammatic plan views of the equipment, in contrast to the illustration of the first embodiment in FIGS. 1a and 1b. Supporting or carrier boards 66a are employed, the extrusion being initially delivered onto the surface of such a board, and the board thereafter being handled and transported from station to station as will be described.

It is contemplated that a multiplicity of carrier boards be employed and these may be brought from any suitable source of supply sequentially to the station indicated by the arrow 72 in FIG. 3. From this station the carrier board is advanced in the direction indicated by the arrow 73, as by a conveyor mechanism of the roller type (a few such rollers being indicated at 74) until the board reaches a position below and in alignment with the path of extrusion, so that a piece S1 may be extruded onto the board in exactly the manner described above with reference to FIGS. 1a, 1b and 2. Although not illustrated in FIGS. 3 to 9, as before, a supply of wax paper may be employed on the surface of the carrier board to facilitate the operation. Preferably this station is defined by means of displaceable abutments 75, so that the carrier board may readily be lined up accurately with the extruder. After extrusion of the desired length of the shape being made, a piece is separated or cut off, as by means of the cutting disc 69. In the embodiment here shown the piece S1 cut off in this manner represents a piece of the length ultimately desired, and in its respect the embodiment of FIGS. 3 to 9 differs somewhat from the embodiment of FIGS. 1a, 1b and 2, wherein the piece extruded is shown as being double the length of the piece ultimately desired. It is to be understood, however, that the system of FIGS. 3 to 9 may also readily be adapted to the handling of pieces of double length, and to the subsequent severing or cutting of those pieces to the desired length, as by employment of cutting discs 71 at the tilting stations described below to which the pieces are subsequently moved. Moreover, as described above in connection with the embodiment of FIGS. 1a and 1b, the tables or supports may be of length greater than twice the length of pieces to be made, with the excess being cut off and returned to the pug mill.

In either event, whether in pieces of single or double length, after extrusion thereof and the initial cutoff by the disc 69, the positioning stops 75 are displaced and the carrier board is shifted from the position in alignment with the extruder nozzle shown in FIG. 3 in the direction indicated by the arrow 76 in FIG. 4 to the position shown in full lines in FIG. 4, this motion of the carrier again being facilitated by the rollers 74 of the conveyor. This displaced station is indicated in FIG. 4 by the numeral 77 and that station may conveniently be defined by a pair of limiting stops 78.

Thereafter the carrier board 66a with the piece S1 thereon may be shifted, either manually or by some appropriate conveyor in the direction indicated by the arrow 79 in FIG. 5 to a station to the left of that figure in which a tilt board 60a having a straightening edge guide 70a is arranged, this tilt board being mounted in the manner illustrated in FIGS. 1a, 1b and 2 so that the piece may be appropriately straightened in accordance with the technique above described.

As soon as the first carrier board 66a is moved from the station 72 to the station in alignment with the extruder, another such board may be brought to the station 72 as is indicated in FIG. 4, and this board may promptly be advanced to the station in alignment with the extruder, as is indicated in FIG. 5, the displaceable stops 75 being again positioned to properly position the board to receive the extrusion. The extrusion of the second piece then proceeds as indicated in FIG. 6, after which it is cut off and then shifted to station 77 as shown in FIG. 7, and is then moved in the direction indicated by the arrow 80 in FIG. 8 to a tilting table 60b having edge guide 70b positioned to the right of the figure, instead of to the left as with the tilt table 60a above referred to.

During the extrusion of the second piece and during the time of its handling and shifting to the tilt table 70b, the piece S1 on the table 60a is being subjected to the straightening operation such as described above with special reference to FIG. 2, and when the straightening is completed the carrier board and the straightened piece are taken away to a suitable point for curing. It will be noted that in FIGS. 6, 7 and 8 the piece S1 appears in the tilt station at the left, but these diagrammatic views do not show the tilt and straightening operation which is then being performed. In any event after the piece at the left has been straightened and removed to the curing station (not shown) the tilt table 60a at the left is again available for receiving another piece, as is indicated in FIG. 9. FIG. 7 also illustrates the bringing of a new carrier board to the station 72, FIG. 8 illustrates the shift of a board from station 72 to the station in alignment with the extruder, and FIG. 9 illustrates the extrusion of the third piece S1.

During the extrusion of the third piece S1 and during its handling and shifting to the tilt table 60a at the left, the straightening operation is being effected on the piece S1 which has been delivered to the table 60b, and thus the cycle of operations is carried on at each of the two tilt table stations with alternate pieces which have been extruded.

The arrangement described above provides a handling system which may be operated with a minimum of interruption. Indeed the establishment of the stations 72 and 77 on the rolling conveyor elements 74 at opposite sides of the station in alignment with extrusion, permits such rapid feed or advancement of successive carrier boards that it is even possible to handle the pieces successively extruded, without interrupting the operation of the extruder much, if at all. This is a preferred mode of operation, particularly because substantial interruption in the operation of the extruder tends to introduce non-uniformity or imperfection in the region of the discharge orifice of the extruder in consequence of the starting and stopping of the material being extruded. While continuous operation without any interruption at all would be ideal theoretically, certain short intervals of interruption may be tolerated without substantial impairment in the quality of the articles being made. Thus, the invention contemplates what might be termed substantially continuous operation of the extruder, and this will yield pieces of good quality notwithstanding short intervals of interruption.

Although only two tilt or straightening stations are illustrated in FIGS. 3 to 9 inclusive, it will be understood that more of these stations may be provided in order to provide adequate time in which to effect handling and straightening of the pieces during the substantially continuous operation of the extruder.

On the other hand the substantially continuous operation of the extruder may be maintained by certain other variations in procedure, including the following:

Instead of establishing alternately used straightening stations, as in the embodiment represented by FIGS. 3 to 9 inclusive, equipment similar to that illustrated in FIGS. 1a, 1b and 2 may be employed in a manner somewhat different from that described above. In this modified procedure the successive lengths of the extrusion are extruded upon boards of the type indicated at 66 in FIG. 2 and are preferably extruded in such relation to a straight edge such as shown at 70 that the successive lengths of the extrusion are in effect straightened against said straight edge as they are extruded. The individual cut pieces are then handled on individual boards 66 of the same or somewhat greater length than the length of the cut pieces, and as soon as a piece is completely extruded and cut off, the piece in already straightened condition is then removed by removing the supporting board for that piece. Each succeeding piece is then transferred from its supporting board to a rack. A rack for this purpose may comprise a board similar to the board 60 having a straight edge 70 thereon, the rack being positioned at an angle similar to the inclined angle shown in dot-dash lines in FIG. 2, although it will be understood that this rack is located at a position remote from the zone of extrusion. A plurality of pieces may be stacked one upon another in a rack of the type just mentioned and the pieces will be retained by gravity in their straightened condition in the rack.

It is contemplated that the pieces be retained in the rack for an interval of time sufficient to effect what might be termed a "pre-curing," i.e., a curing for an interval sufficient to render the pieces self-supporting. In a typical case this period may be about 16 hours. While the pieces may remain even longer in such a rack, it is preferred to move the pieces from the rack and to introduce them into an accelerated curing operation or process, such as an autoclave, a heated immersion bath, or the like. If desired the pieces could be retained in the rack for a time sufficient to permit complete curing but this, of course, would necessitate use of many racks because of the long time required for complete curing in the absence of any curing acceleration treatment.

After the individual piece has been transferred by means of the board 66 from the position in line with the extrusion operation to a position in a pre-curing rack, the board 66 is of course returned to the extrusion line in order to receive another piece from the extruder.

It is further contemplated that instead of providing a straight edge such as indicated at 10 in FIG. 2 upon the support table 60, such a straight edge may be provided directly upon the board 66 for receiving the extrusion, in which event this board may also serve the purpose of effecting a straightening operation after a piece has been removed from the extrusion line, this operation being achieved by tilting the board 66 with its attached straight edge to an inclined position, for instance a position such as shown in dot-dash lines in FIG. 2, and after the straightening action effected in this manner, the straightened piece may then be transferred from the board 66 to the pre-curing rack, and the piece treated in the manner described above, i.e. retained for an interval to render the piece self-supporting and then transferred to an accelerated curing operation for development of the full strength of the piece.

In each instance the boards for receiving the successive lengths of the extrusion will of course be brought into the extrusion line in sequence, thereby enabling substantially continuous extrusion.

By operating in this substantially continuous manner, the system as a whole takes full advantage of the improvement (ease of extrusion) effected in the process as a result of the technique for mixing the ingredients of the furnish as described above, i.e., the employement of only a short mixing time following the addition of water and preferably also the employement of a relatively short time for the addition of the water, which result in reduced power requirements in the extruder and ease of extrusion.

We claim:

1. A method for making elongated asbestos-cement pieces of predetermined length comprising substantially continuously extruding a furnish comprising a moistened admixture of asbestos and cement from an extruder having a discharge orifice substantially conforming in size and shape to the cross section of the piece being made, preparing the furnish by sequentially subjecting batches comprising asbestos and cement to mulling to effect intermixture thereof first in dry condition and then with water to moisten the furnish, sequentially delivering the prepared batches of furnish to the extruder to maintain the substantially continuous operation thereof, cutting off lengths of the extrusion conforming with the predetermined length of the pieces being made sequentially straightening the succeeding lengths of the extrusion, sequentially placing the cut pieces in a rack capable of retaining the pieces in straightened shape during a precuring interval of sufficient duration to render the pieces self-supporting, and subjecting the pre-cured pieces to an accelerated curing operation to develop the full strength of the pieces.

2. A method as defined in claim 1 in which the succeeding lengths of the extrusion are straightened as they are extruded.

3. A method as defined in claim 1 in which the succeeding lengths of the extrusion are straightened after the cutting into pieces.

4. A method for making elongated asbestos-cement pieces of predetermined length comprising substantially continuously extruding a furnish comprising a moistened admixture of asbestos and cement from an extruder having a discharge orifice substantially conforming in size and shape to the cross section of the piece being made, preparing the furnish by sequentially subjecting batches comprising asbestos and cement to mulling to effect intermixture thereof first in dry condition and then with water to moisten the furnish, sequentially delivering the prepared batches of furnish to the extruder to maintain the substantially continuous operation thereof, cutting off lengths of the extrusion conforming with the predetermined length of the pieces being made, sequentially removing the succeeding cut pieces to different stations remote from the extrusion orifice, subjecting the pieces to straightening operations in said different stations before curing thereof, and thereafter removing the straightened pieces from the straightening stations to a curing region and effecting curing thereof.

5. A method for making elongated asbestos-cement pieces of predetermined length comprising substantially continuously extruding a furnish comprising a moistened admixture of asbestos and cement from an extruder having a discharge orifice substantially conforming in size and shape to the cross section of the piece being made, preparing the furnish by sequentially subjecting batches comprising asbestos and cement to mulling to effect intermixture thereof first in dry condition and then with water to moisten the furnish, sequentially delivering the prepared batches of furnish to the extruder to maintain the substantially continuous operation thereof, cutting off lengths of the extrusion conforming with the predetermined length of the pieces being made, sequentially straightening the succeeding lengths of the extrusion, and sequentially placing the cut pieces in a rack capable of retaining the pieces in straightened shape and retaining the straightened pieces in said rack at least for an interval of time sufficient to render the pieces self-supporting.

References Cited

UNITED STATES PATENTS

| | | | |
|---|---|---|---|
| 781,934 | 2/1905 | Christiansen | 25—113 |
| 885,809 | 4/1908 | Waggoner | 25—113 |
| 1,977,158 | 10/1934 | Thurman et al. | 106—99 |
| 3,003,216 | 10/1961 | Schmunk et al. | 25—2 |
| 3,219,467 | 11/1965 | Redican et al. | 106—99 X |
| 3,242,548 | 3/1966 | Diller et al. | 25—109 X |

FOREIGN PATENTS 538,735    8/1941    Great Britain.

ROBERT F. WHITE, Primary Examiner

J. H. SILBAUGH, Assistant Examiner

U.S. Cl. X.R.

25—2; 264—151, 234, 294